United States Patent

Masnik

[15] 3,699,812
[45] Oct. 24, 1972

[54] MASS FLOWMETER
[72] Inventor: Walter Masnik, 11 Cecil Court, Cedar Grove, N.J. 07009
[22] Filed: Jan. 29, 1971
[21] Appl. No.: 110,839

[52] U.S. Cl. ................................................73/205 D
[51] Int. Cl. .................................................G01f 1/00
[58] Field of Search .........................73/205 D, 205 R

[56] References Cited
UNITED STATES PATENTS 3,015,233   1/1962   Ryder et al. .............73/205 D
3,240,061   3/1966   Bloom et al..............73/205 D

*Primary Examiner*—James J. Gill
*Assistant Examiner*—John P. Beauchamp
*Attorney*—Edwin E. Greigg

[57] ABSTRACT

Mass flow is measured by providing a restrictor in a conduit and a differential pressure transducer to measure the pressure drop across the restrictor. In one modification a variable speed piston pump connected across the restrictor alternately adds and subtracts flow to the conduit. The speed of the pump is responsive to changes from a reference pressure drop across the restrictor to maintain the pressure differential constant across the flow restrictor for changes in the mass flow rate. An indicator responsive to the speed of the pump serves to measure the mass flow rate which is inversely proportional to the speed of the pump. In a second modification like results are obtained by oscillating the restrictor in an axial direction instead of using a pump.

9 Claims, 4 Drawing Figures

PATENTED OCT 24 1972                3,699,812
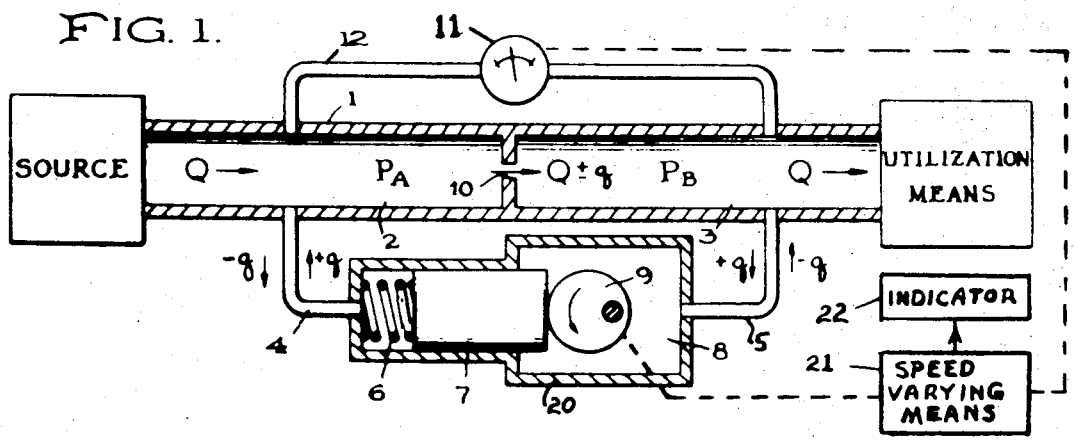
FIG. 1.
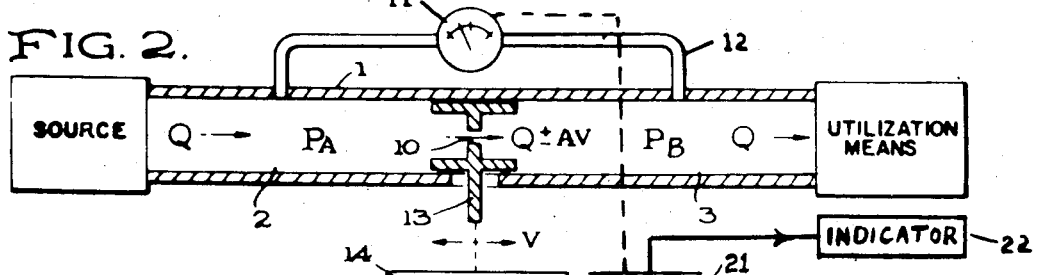
FIG. 2.
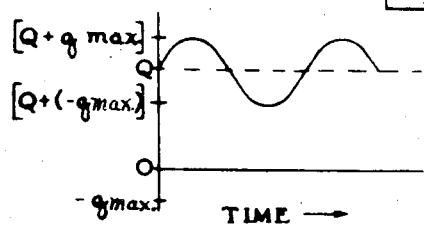
FIG. 3.
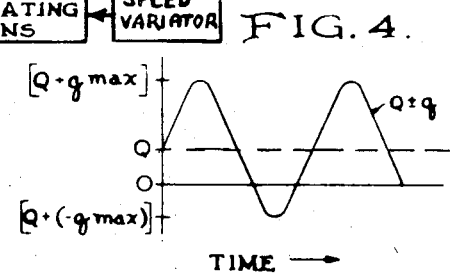
FIG. 4.
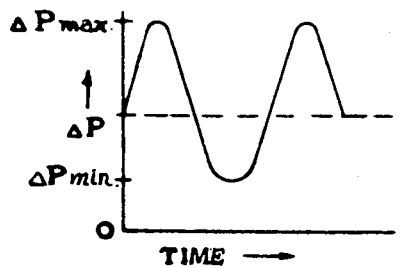
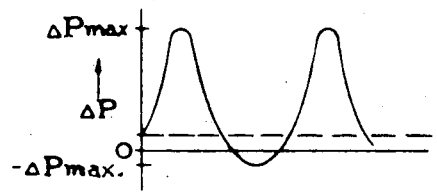
Inventor
Walter Masnik
By Edwin L. Gregg
Attorney

MASS FLOWMETER

This invention relates to apparatus adapted to measure rate of flow of liquids and more particularly relates to flow meters adapted to measure mass flow rate by controlling the amount of volumetric flow of fluid which is added and subtracted on opposite sides of a flow restrictor.

In the recirculation type of mass rate flowmeter, recirculation pumps or other such devices are used to obtain a recirculation of a constant volumetric flow in the meter. The meter is essentially a differential pressure type meter in which a constant volumetric flow is added or subtracted from the fluid being measured. The subject invention is an improved flowmeter of this type.

The present invention is based upon principles embodied in U.S. Pat. No. 3,338,097 but has certain features which offer improved mass flow rate data transmission and indication in certain applications.

It is an object of this invention to provide a flowmeter which uses a single differential pressure indicator or transducer to obtain a frequency indication of mass flow rate of fluids having different densities.

It is an object of this invention to obtain mass flow rate indications by keeping the pressure differential across a flow restrictor constant by regulating the speed of a pump which cyclicly adds and subtracts a volume of fluid to that under measurement.

It is another object of this invention to provide a novel flowmeter which is displaced in a cyclic manner.

Other objects and fuller understanding of the invention may be had by referring to the following description and claims taken in conjunction with the accompanying drawings in which:

FIG. 1 is a schematic drawing of a flowmeter with a single flow restrictor, a single differential pressure indicator or transducer and a speed adjustable pump.

FIG. 2 is a schematic drawing of a flowmeter with an oscillating frequency controlled flow restrictor and a single differential pressure indicator or transducer.

FIG. 3 is a graph illustrating the effect of oscillation on flow and pressure drop; and FIG. 4 is another graph illustrating the effect of oscillation on flow and pressure drop.

FIG. 1 shows a schematic drawing of a conduit 1 through which variable input and output volumetric flow Q is directed from, for example, any well known source of fluid such as a reservoir to any well known fluid utilization or receiving means. The conduit 1 has two sections 2 and 3 spaced therealong and each of these sections is bridged by branch conduits 4 and 5 respectively which have a reciprocating plunger 7 disposed intermediate the ends thereof. Reciprocating plunger 7 operates by means of cam 9 and spring 6.

This reciprocating plunger 7 alternately adds flow to and subtracts flow from the flow in conduit 1. As plunger 7 is forced to the left against spring 6 by eccentric 9, a flow $+q$ is generated in conduit 4 and a like flow $+q$ is generated into chamber 8. In this mode of operation the flow through flow restrictor 10 is the summation of flows, $Q+q$. As eccentric 9 continues to rotate, plunger 7 changes direction of motion and is forced to the right by spring 6. The flow in conduit 4 and the flow into chamber 8 also change direction, so that the flows in each can be expressed as $-q$ in this mode of operation, and the flow through restrictor 10 then becomes the difference in flows, $Q-q$.

It has been found that by connecting a meter through line 12 adapted to measure the differential pressure between these sections 2 and 3, such as a differential pressure transducer 11 a reading can be obtained which linearly closely approximates the mass flow rate through the conduit 1.

Under certain conditions it is desirable to obtain the mass flow rate data as a frequency signal rather than an analog signal such as the pointer indication on a differential pressure transducer. This is accomplished in the present invention by keeping the $\Delta p$ or pressure differential read by 11 constant by regulating the speed of the pump 20 and thus varying "$q$" to accomplish this objective. This can be done by choosing a reference $\Delta p$ and using variable speed pump 20 which is controlled by means of known servo mechanisms such as a speed controlling means 21 responsive to the output of the $\Delta P$ sensor 11 (shown as a dotted line coupling) to control the speed (and hence "$q$") of pump 20 (shown as a dotted line control coupling) whereby the mass flow rate is measured by indicator 22 as being inversely proportional to the pump speed.

From U.S. Pat. No. 3,266,309 we have the derived equation where:

$$\Delta p = 2SQq/gA^2 = 2q/gA^2 (SQ)$$

where:
S=density of fluid
$\Delta p$=differential pressure
Q=volumetric flow rate
q=pump volumetric flow rate
g=gravity constant
A=area of metering element Then, equating for $q$ we have, $$1/q = 2SQ/gA^2 \Delta p$$

Now we let $q=nv$ where n=pump revolutions per minute and v=volumetric displacement per revolution of pump which gives us:

$$1/nv = 2SQ/gA^2 \Delta P \text{ or } 1/n = 2vSQ/gA^2 \Delta P$$

We can now let $$K_1 = 2v/gA^2 \Delta P$$

(a constant in the design if we hold $\Delta p$ constant.)
Thus, $$1/n = K_1 (SQ) = K_1 W$$

where $SQ=W$ (mass flow rate.) Where previously it was shown that the differential pressure was directly proportional to the mass flow rate, it has now been shown through modification that the pump speed or pump revolutions per minute is inversely proportional to the mass flow rate. Embodiments of this invention so modified have the advantage that increased accuracy of flow measurement can be obtained in the low flow regions.

In FIG. 2, the same principle is used in connection, for example, in measuring flow from a source to a utilization means such as shown in FIG. 1 with the alternative arrangement, consisting of a flow restrictor 10 with a means 14 for oscillating said flow restrictor 10 through connection 13 so there is a component of the oscillating motion which is axial with conduit 1. In this embodiment if the flow restrictor 10 has an instantaneous axial displacement rate $Vi$ and since $ViA=qi$, then the instantaneous flow rate $Qi$ through the flow restrictor 10 will be as follows:

$$Qi = Q + qi$$

As in the arrangement shown in FIG. 1, when $qi = +q$ and $qi = -q$ the result will be:

$$\Delta P_1 - \Delta P_2 = S/2C^2A^2 [(Q+q)^2 - (Q-q)^2] = KM$$

Where $\Delta P_1$ occurs when we have $+qi$ and $\alpha P_2$ occurs when we have $-qi$.

In either arrangement shown in FIGS. 1 and 2, the pressure differentials may be measured at any points where $Qi = +q$ and $-q$. Normally, however, the most convenient values are those in which $+q$ and $-q$ are maximum or peak values.

This can then be sensed and indicated by "peak to peak" measuring devices, as for example, a strain gauge type of pressure transducer together with a voltmeter.

In FIGS. 3 and 4, there are shown pictorial representations of the way in which flow rate and pressure drop through the flow restrictor vary with time for the case in which $Qi = +qmax.$ and $-qmax.$ are smaller than processes flow rate $Q$, and the case where they are larger than $Q$, respectively.

In FIG. 3, the flow through the flow restrictor is always in the same direction, so the pressure differential is always greater than zero. The mass flow rate is proportional to the difference between maximum and minimum pressure differentials, assuming a "peak to peak" measurement. In FIG. 4, the flow through the flow restrictor constantly changes direction resulting in a pressure differential which periodically changes from positive to negative. In this case mass flow rate is proportional to the difference between maximum positive and maximum negative pressure differentials, assuming "peak to peak" measurement.

Where it is desired to obtain a frequency signal, the $\Delta P$ or pressure differential read by 11 is held constant by regulating the oscillating frequency of means 14 by speed variator 21. Speed variator 21 responds to departures of the indicator 11 from a predetermined amplitude of $\Delta P$ (shown in dotted lining) to control the oscillating frequency of 14 (shown in dotted lining) in a direction to change "q" such that $\Delta P$ is maintained at said predetermined amplitude. Indicator 22 which is responsive to speed variator 21 measures the mass flow rate as inversely proportional to the oscillating frequency. The predetermined amplitude can be selected to best accomodate the mass flow rates to be encountered.

Although we have described our invention with a certain degree of particularity, it is understood that the present disclosure has been made only by way of example and that numerous changes in the details of construction and the combination and arrangements of parts may be resorted to without departing from the spirit and scope of the invention as hereinafter claimed.

What I claim as new and desire to secure by Letters of Patent of the United States is:

1. A mass flowmeter adapted to measure the mass flow rate of fluid passing therethrough at a changing mass flow rate comprising a flow restrictor positioned in said path of flow of fluid passing through the flowmeter, means for recurrently modifying the volumetric rate of flow of fluid through said flow restrictor such that it is equal to the volumetric rate of flow of said measured mass flow plus and then minus a further volumetric rate of flow of fluid, means for controlling the modifying means to vary the further volumetric rate of flow to maintain the pressure differential constant across said flow restrictor for changes in said mass flow rate and means responsive to the recurrence rate of said modifying means for providing an indication of the mass flow rate of fluid being measured.

2. An arrangement according to claim 1 wherein said further volumetric flow rate is less than said first mentioned volumetric flow rate.

3. An arrangement according to claim 1 wherein said further volumetric flow rate is greater than said first mentioned volumetric flow rate.

4. An arrangement according to claim 1 wherein said modifying means comprises a pump with inlet and outlet parts located on opposite sides of said orifice.

5. An arrangement according to claim 1 wherein said modifying means comprises means for displacing said orifice along the path of fluid flow in said conduit.

6. In combination, a source of fluid, fluid utilization means, means for passing fluid from said source to said utilization means comprising a conduit having a flow restrictor, means for measuring the mass flow rate of fluid comprising means for displacing said flow restrictor in a recurrent manner to have a component of displacement which is axial with said conduit to add and then subtract a volumetric rate of flow of fluid to the measured fluid passing through said flow restrictor, means for controlling the displacement recurrence rate of said flow restrictor as a function of the differential pressure developed across said flow restrictor to tend to maintain the pressure differential at a predetermined amplitude across said flow restrictor for changes in said mass flow rate, and means responsive to said controlling means to provide an indication of said mass flow rate of fluid being measured.

7. In combination, a source of fluid, fluid utilization means, means for passing fluid from said source to said utilization means comprising a conduit having a flow restrictor, means for measuring changes in the mass flow rate of fluid passing through said conduit comprising means for displacing said flow restrictor to have a component of displacement which is axial with said conduit to add and then subtract volumetric rates of flow of fluid to the measured fluid passing through said flow restrictor and means responsive to the differential pressure developed across said flow restrictor for adjusting the displacement recurrence rate of said flow restrictor to maintain a constant value of differential pressure independent of changes in the mass flow rate of said measured fluid.

8. The combination of claim 7 further comprising means responsive to the controlled recurrence rate to provide an indication of said mass flow rate of fluid being measured.

9. In combination, a source of fluid, fluid utilization means, means for passing fluid from said source to said utilization means comprising a conduit having a flow restrictor, means for measuring the mass flow rate of fluid comprising means for displacing said flow restrictor in a recurrent manner to have a component of displacement which is axial with said conduit to add and then subtract a volumetric rate of flow of fluid to the measured fluid passing through said flow restrictor, means responsive to the differential pressure developed across said flow restrictor for controlling the displacement recurrence rate of said flow restrictor to maintain the differential pressure constant while the mass flow rate of said measured fluid is changing, and means responsive to the controlled recurrence rate to provide an indication of said mass flow rate of fluid being measured.

* * * * *

PO-1050
(5/69)

UNITED STATES PATENT OFFICE
CERTIFICATE OF CORRECTION

Patent No. 3,699,812  Dated October 24, 1972

Inventor(s) Walter Masnik

It is certified that error appears in the above-identified patent and that said Letters Patent are hereby corrected as shown below:

In col. 1, line 62, "Q + a" should read --Q + q--.

In col. 3, line 2, "$\alpha P_2$" should read --$\Delta P_2$--; in line 6, "Qi = +q" should read --qi = +q--; in line 16, "Qi = +qmax" should read --qi = +qmax--.

Signed and sealed this 10th day of July 1973.

(SEAL)
Attest:

EDWARD M. FLETCHER, JR.
Attesting Officer

Rene Tegtmeyer
Acting Commissioner of Patents